UNITED STATES PATENT OFFICE.

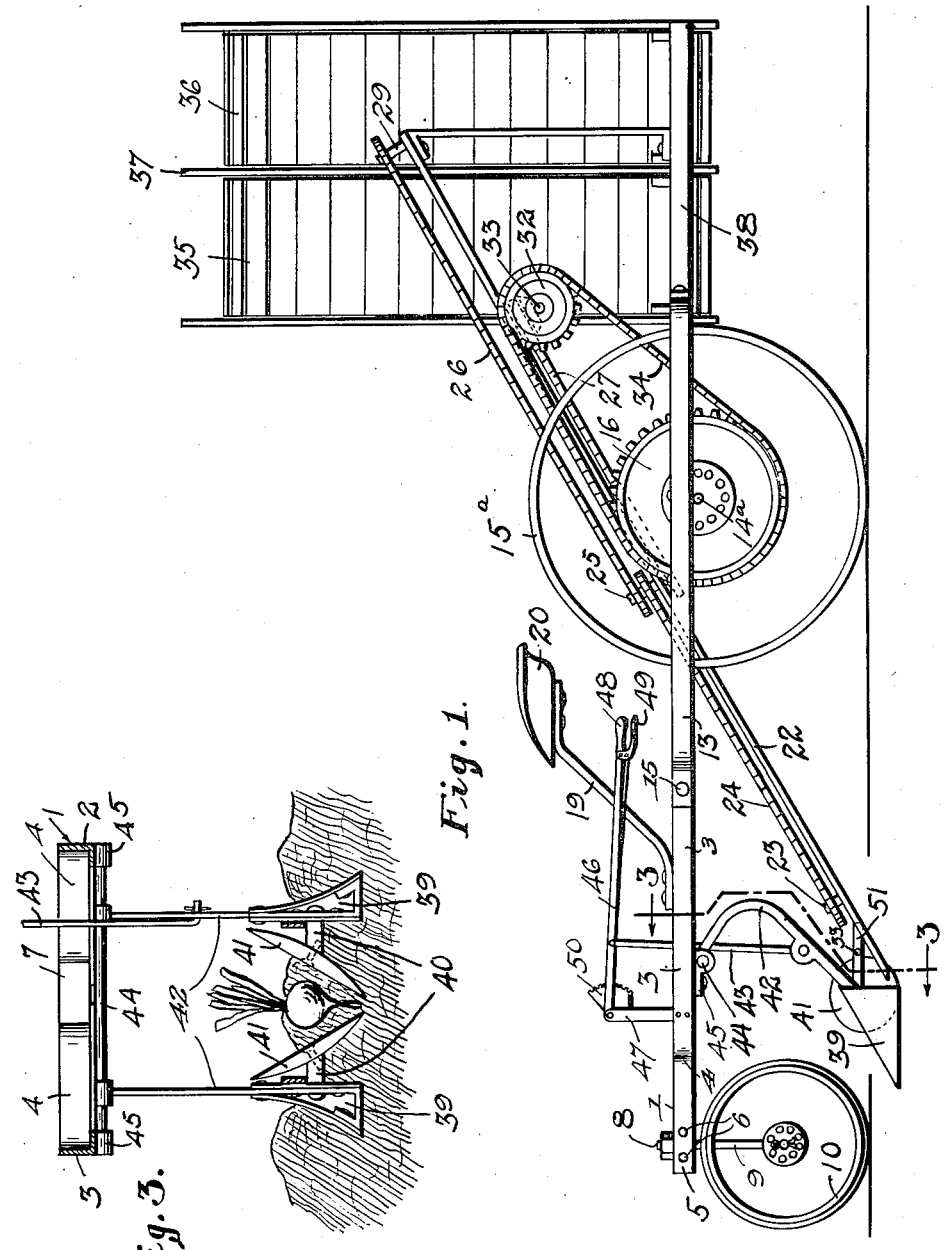

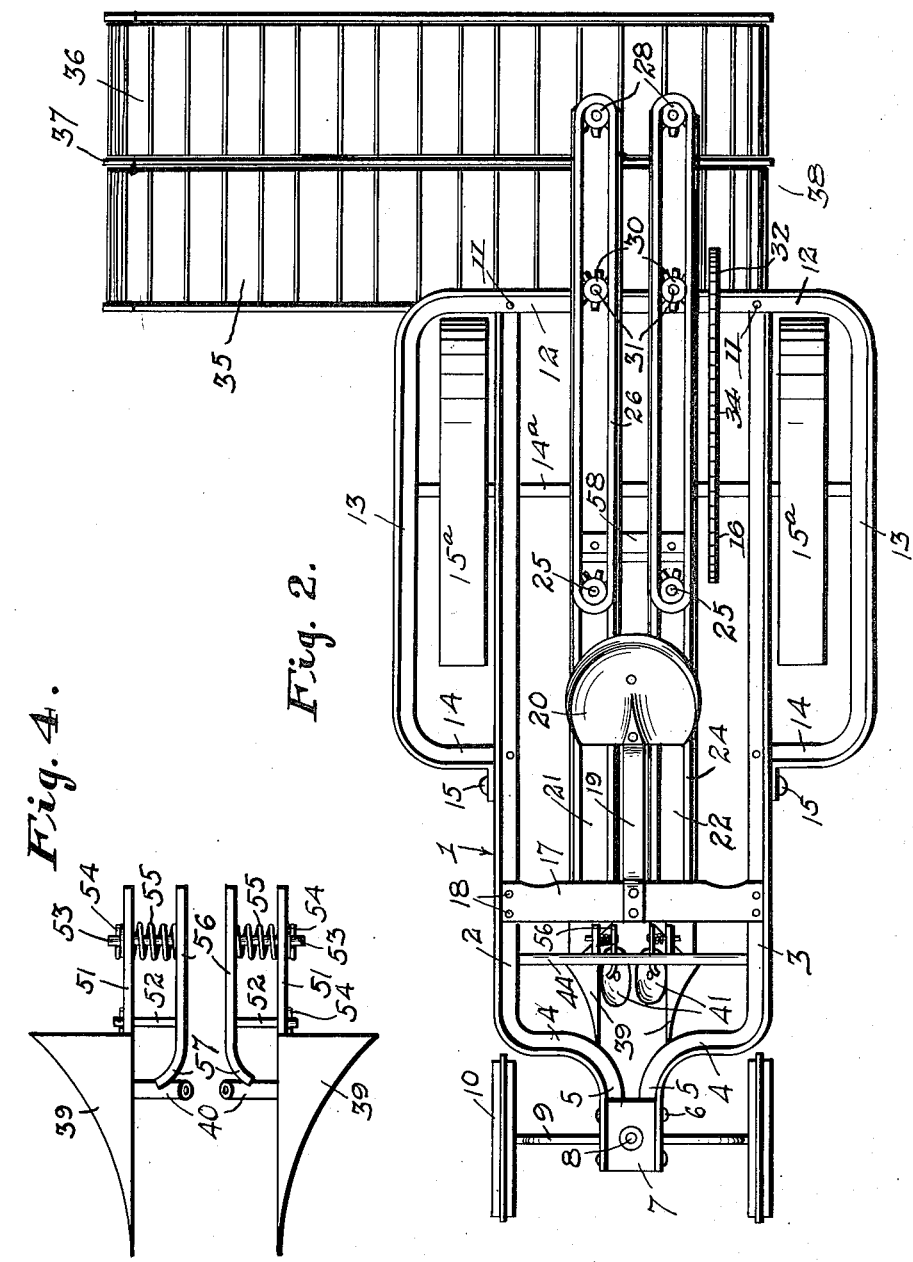

WILLIAM M. FERGUSON, OF LINDSAY, OKLAHOMA.

BEET-HARVESTER.

1,185,785.   Specification of Letters Patent.   Patented June 6, 1916.

Application filed May 14, 1915. Serial No. 28,113.

*To all whom it may concern:*

Be it known that I, WILLIAM M. FERGUSON, a citizen of the United States, residing at Lindsay, in the county of Garvin and State of Oklahoma, have invented certain new and useful Improvements in Beet-Harvesters; and I do hereby declare the following to be a full, clear, and exact description of the invention, such as will enable others skilled in the art to which it appertains to make and use the same.

This invention relates to new and useful improvements in beet harvesters and the principal object of the invention is to provide a device which is capable of topping as well as pulling beets and similar vegetables.

Another object of the invention is to provide a device which will effectively cut the beet from the ground, thereby eliminating danger of injury when the same is pulled.

A further object of the invention is to provide a novel means for holding the beet in an upright position until the same is gripped by the carriers on the carrier chains.

A still further object of the invention is to provide a device having conveyers attached to the rear end which will carry the tops and the bodies of the beets into a suitable wagon or other receptacle and deposit them in two separate compartments.

With these and other objects in view, the invention consists in the novel combination and arrangement of parts which will be fully set forth in the following specification and accompanying drawings, in which:—

Figure 1 is a side view in elevation of a beet topper and puller constructed in accordance with this invention. Fig. 2 is a top plan view of the device with the lifting mechanism for the plows removed. Fig. 3 is a sectional view on line 3—3 of Fig. 1, illustrating the device cutting the beet from the ground, and Fig. 4 is a detail top plan view of the plows showing the colters removed and also with the plow beams removed.

Referring now to the drawings by characters of reference, the numeral 1 designates as an entirety, the main frame of the device comprising the side bars 2 and 3. Each of these bars is bent inwardly at its forward end as at 4 and terminates in the forward extension 5, which extensions are bolted or otherwise secured as at 6 to the block 7 which is formed with a central opening for the reception of the vertical stem 8 of the front axle 9 on which the wheels 10 are journaled. The bars 2 and 3 are preferably angle bars, and extend rearwardly as illustrated in the drawings and riveted or otherwise secured to the rear ends of the bars as at 11 is the rear connecting bar 12 which terminates at each end in the forward extension 13, which is bent inwardly as at 14 and riveted or otherwise secured as at 15 to the sides of the bars 2 and 3. Suitable journal bearings (not shown) are secured to the bars 2 and 3 and to the bars 13 and hold the shaft $14^a$ in proper position with relation to the frame. The wheels $15^a$ are secured to the shaft $14^a$ and form drive wheels for the device. Keyed or otherwise secured to the shaft $14^a$ intermediate its ends is a suitable sprocket wheel 16, the use of which will appear as the description proceeds.

A suitable transversely extending plate 17 is riveted or otherwise secured as at 18 to the side bars 2 and 3 and riveted intermediate the ends of this plate is a suitable support 19 for the seat 20.

The downwardly inclined parallel guide arms 21 and 22 are provided and these arms are provided at their forward ends with inwardly beveled portions which act as guides for the beets. Supported at the lower ends of these arms are the stub axles 23 for the support of suitable sprockets over which the carrier chains 24 pass. These chains pass over suitable sprockets carried on the shafts 25 which extend through the guide arms 21 and 22 and are provided at their upper and lower extremities with suitable sprockets over which the chains 26 and 27 pass. The chains 26 extend to the extreme rear ends of the guides 21 and 22 and pass over the sprockets 28 carried on the stub shafts 29 while the chains 27 on the under side of the guide arms pass over suitable sprockets 30 carried on the shafts 31 which are located a short distance from the rear ends of the guide board. It will thus be seen that the articles carried by the carrier chains 27 will be dropped sooner than those carried by the carrier chains 26. In order to drive the device, the sprocket 32 is provided and is carried on the axle 33 which is provided with suitable gears to mesh with gears carried by the sprockets 31. It will thus be seen that when the sprocket 32 is revolved, the entire mechanism will be set in operation. In order to drive the sprocket 32, the chain 34 is provided and passes around the sprocket 16 and the sprocket 32 so that as the harvester moves, the mechanism will be set in motion. A suitable driving mechanism (not shown) is provided for the body and top conveyers designated respectively by the numerals 35 and 36, which conveyers are separated by the partition wall 37 and supported on the bar 38 which is riveted or otherwise secured to the rear end of the frame 1.

In order to provide a means for efficiently loosening the beets from the ground before pulling the plows, designated by the numeral 39, are provided and are arranged so that their landsides are adjacent each other. Secured to the plows and extending from the landsides thereof are the arms 40 terminating at their inner ends in suitable beveled faces to which the colters 41 are secured in any suitable manner. Due to the inclination of the inner faces of the extensions 40, it will be evident that the lower edges of the colters will nearly meet and thus cut the beets from the ground as illustrated in Fig. 3. The plows are supported on suitable plow beams 42, having pivoted intermediate their ends the links 43, the use of which will appear as the description proceeds. The upper ends of the plow beams are carried by the shaft 44, which is journaled in suitable bearing brackets 45 secured to the under side of the frame 1. The upper end of the link 43 is pivoted to the lever 46, the forward end of which is pivoted to a suitable standard 47. The rear end of this lever extends to a point in close proximity to the seat 20 and is provided with the grip 48 and a suitable latch controlling member 49 which controls the latch engaging the arcuate plate 50 secured to the standards 47. It will thus be seen that the plows 39 can be adjusted to various heights so as to adjust the depth of the cut.

In order to hold the beets after the same have been loosened by the plows and colters, suitable extensions 51 are secured to the plows and extend rearwardly therefrom provided with apertures for the reception of the guide pins 52 and 53. These pins are held from movement out of their respective apertures by means of the cotter pins 54 and the pins 53 are surrounded by suitable compression coil springs 55 which are arranged to exert inward pressure on the shoes 56, the forward ends of which are turned outwardly as at 57.

It will be apparent from the foregoing that in use the plows are lowered to their desired depth and upon pulling the device it will be apparent that the plows will loosen the earth and the colters will cut the earth around the beet, thereby loosening the same and permitting the sharpened ends of the guide arms 21 and 22 to sink into the ground and cause the beet to be removed therefrom. Upon the removal of the beet, it will be evident that the shoes 56 will engage the same and hold it until the arms carried by conveyer chains 24 will engage the beet whereupon the same is carried upwardly until the arms on the conveyer chains 26 and 27 engage the top and body of the beets respectively whereupon the top is severed from the body by means of the knife 58 which is carried by the guide arms and extends transversely thereof. After the tops have been severed from the bodies, the same are carried rearwardly by the chain 26 and after reaching the entire length of travel it will be evident that they will be dropped upon the conveyer 36 and carried to the proper receptacle in the wagon or other conveyance. The bodies of the beets will travel on their respective carrier chains 27 and be carried rearwardly until they are dropped upon the conveyer 35 whereupon they will be moved up said conveyer and in to their respective receptacles in the wagon or other conveyance. It will thus be seen that the tops will be severed from the beets and deposited in their proper places, while the bodies of the beets will be deposited separately.

From the foregoing it will be evident that a particularly simple and efficient beet harvester is provided wherein the tops are severed from the beets after the beets have been removed from the ground and in which the tops are deposited in suitable receptacles, separate from the bodies of the beets. It will also be evident that a particularly efficient means is provided for loosening the beets before the same are pulled, thereby avoiding injury and removing the danger of the tops being accidentally torn from the beets.

While in the foregoing there has been shown and described the preferred embodiment of this invention, it is to be understood that such changes may be made in the combination and arrangement of parts as will fall within the spirit and scope of the appended claims.

What is claimed is:

1. In combination, a beet harvester including a frame and carrier chains, diggers, each of said diggers comprising plows, inward extensions on the plows projecting toward each other, colters at the inner ends of the inward extensions, said colters extending at angles to cut the beets from the earth, and means to hold the beets after being loosened in position to be picked up by the carrier chains.

2. In combination with a beet harvester including a frame, guide arms carried by the frame, carrier chains on the guide arms, diggers, said diggers comprising plows having a landside, adjacently disposed extensions at the rear ends of the plows, guide shoes, guide pins carried by the shoes and extended through the extensions, and springs to force the shoes toward each other, said shoes holding the beets in proper position to be picked up by the carrier chains after they have been loosened from the earth.

3. A beet harvester having carrier chains, plows, the landsides of the plows being disposed toward each other, colters supported on the plow inwardly from the landside said colters being disposed angularly to cut a V-shaped trough and loosen the beets and means carried by the plow to support the beets in position to be picked up by the carrier chain.

In testimony whereof I affix my signature in presence of two witnesses.

WILLIAM M. FERGUSON.

Witnesses:
   H. L. FERGUSON,
   W. J. WRIGHT.